United States Patent [19]

Flatt

[11] Patent Number: 4,493,734

[45] Date of Patent: Jan. 15, 1985

[54] CONDITIONING OF CRUDE PIGMENT IN A SALT FREE CORN SYRUP BASED MEDIUM

[75] Inventor: Thomas R. Flatt, Ridgewood, N.J.

[73] Assignee: Mobay Chemical Corporation, Pittsburgh, Pa.

[21] Appl. No.: 497,379

[22] Filed: May 23, 1983

[51] Int. Cl.$^3$ .................... C09C 1/00; C09C 3/00; C09B 1/00

[52] U.S. Cl. .................... 106/309; 106/308 C; 106/288 R; 106/308 R

[58] Field of Search .......... 106/288 R, 308 R, 308 C, 106/309

[56] References Cited

U.S. PATENT DOCUMENTS

| | | | |
|---|---|---|---|
| 2,816,114 | 12/1957 | Ehrich et al. | 260/314.5 |
| 2,982,666 | 5/1961 | Chun et al. | 106/308 |
| 3,748,164 | 7/1973 | Akamatsu et al. | 106/288 Q |
| 4,298,399 | 11/1981 | Formica et al. | 106/309 |
| 4,371,643 | 2/1983 | Thomas | 524/88 |

OTHER PUBLICATIONS

Perry et al., Chemical Engineers' Handbook, 5th ed., Section 8: pp. 1, 2 and 25, Section 19: pp. 1, 2 and 14.

Primary Examiner—Herbert S. Cockeram
Attorney, Agent, or Firm—Gene Harsh; Lawrence S. Pope

[57] ABSTRACT

Process for the conditioning of a pigment by applying shear to a crude pigment in the presence of a liquid conditioning agent selected from the group consisting of corn syrup, corn syrup solids and molasses and optionally in the presence of a viscosity modifying agent, in a medium which is essentially free from an added inorganic salt.

14 Claims, No Drawings

CONDITIONING OF CRUDE PIGMENT IN A SALT FREE CORN SYRUP BASED MEDIUM

FIELD OF THE INVENTION

This invention relates to a process for the conditioning of crude pigments.

BACKGROUND OF THE INVENTION

Many organic pigments do not have an appropriate particle size distribution as recovered from chemical synthesis to be directly used in pigmentary applications so it is necessary to "condition" them. U.S. Pat. No. 2,816,114 outlines the three main approaches which the art had taken; acid pasting; salt milling and solvent milling. This patent and U.S. Pat. No. 2,982,666 proposed alternative techniques which avoided the necessity of utilizing a ball mill but these techniques still generally required a solid grinding aid. The former patent particularly emphasized borax whereas the latter utilized sodium chloride, urea, sucrose and sodium sulfate in its examples. Example 32 of the U.S. Pat. No. 2,982,666 does appear to report the conditioning of a phthalocyanine pigment by intensive mixing in a Banbury device using just a polyethylene glycol medium. However, it is evident from U.S. Pat. No. 3,748,164 that later workers generally viewed the teachings of the U.S. Pat. No. 2,982,666 as interesting only when a "grinding aid" was utilized. This patent proposed a certain class of tackifying agents for use in this salt grinding process. More recently in U.S. Pat. No. 4,298,399 it has been proposed to salt grind in a medium of corn syrup, corn syrup solids or molasses.

The present applicants have surprisingly found it possible to suitably condition organic pigments without the use of a solid "grinding aid" such as salt and without the need to use masticator machines of the heavy duty dispersion mixer type (Banbury or Baker-Perkins type, for example) required by the U.S. Pat. No. 2,982,666. In fact, they have found a technique which allows the use of the sigma double arm mixers which are specifically identified as unsuitable in this patent at column 5, lines 17 to 20.

BRIEF DESCRIPTION OF THE INVENTION

The present invention is addressed to an improved conditioning process by which good size reduction efficiency is obtained even without the addition of salt. More particularly, this invention deals with an improved process for the conditioning of a pigment by reducing the particle size of a crude pigment in the presence of a conditioning agent selected from the group consisting of corn syrup, corn syrup solids and molasses and optionally in the presence of a viscosity modifying agent, by applying shear in a medium which is essentially free from an added inorganic salt or other solid grinding aids.

DETAILED DESCRIPTION OF THE INVENTION

The process is especially suitable for the conditioning of an organic pigment. Examples of pigments which may be advantageously conditioned by the inventive process are pigments of the anthranthrone, pyranthrone, iso-violanthrone, flavanthrone, indanthrone, naphthalidazine, thioindigo, naphthalene tetracarboxylic acid, quinacridone, dioxazine, isoindolinone, perylene tetracarboxylic acid, anthrapyrimidine, acylamino anthraquinone, dianthraquinonyl, azo anthraquinone, azomethine anthraquinone and optionally chlorinated and/or brominated metal phthalocyanine series.

The inventive process is especially suitable for the conditioning of a pigment from the perylene tetracarboxylic acid bisimide and optionally chlorinated and/or brominated copper phthalocyanine series.

Individual examples are: C.I. Pigment Red 179, Pigment Blue 15 and copper phthalocyanine blue containing 3-4% of chlorine.

The crude pigment is conditioned after it has been prepared by any of the well known processes of making the crude pigment. The crude pigment can be employed either dry or as presscake.

The corn syrup and corn syrup solids employed can be of any commercially available type. A typical liquid type consists of about 80% solids and about 20% water. A typical solid type contains about 96% solids. Molasses is commercially available, too. A typical product contains 50% sugar, 23% water, 19% organic non-sugar components (containing 1.6% nitrogen) and about 8% ash.

Corn syrup is especially preferred.

The amount of conditioning agent used is preferably 0.2 to 5 parts by weight and particularly advantageously 0.5 to 2 parts by weight, based on 1 part by weight of the crude pigments.

The agents used to modify the viscosity of the conditioning agents, preferably are protic polar solvents like water, glycols, polyglycols or glymes or mixtures thereof. They are used in amounts of up to 50 parts by weight of the crude pigment.

Suitable agents include: ethylene glycol, propylene glycol, dipropylene glycol and tripropylene glycol. Polyethylene glycols 200, 350, 400 and 600, polypropylene glycol 425, polyethylene glycol 400 and mixtures of said polyethylene and polypropylene glycols are preferred.

The process of the present invention may be conducted in any type of apparatus suitable for mixing and applying shear to pastes and viscous materials. The device may be of a continuous or a batch type. Such suitable apparatus is described at pages 4 through 26 of Section 19 of the 5th Edition of Chemical Engineers Handbook edited by Perry and Chilton and incorporated herein by reference. Disclosures of suitable apparatus can also be found in U.S. Pat. Nos. 2,816,114; 2,982,666; 3,748,164 and 4,298,399 all of which are incorporated herein by reference. The heavy duty mixers known to the trade as Baker-Perkins, Werner Pfleiderer, Banbury or Moriyama Seisakusho are preferred. The double-arm dispersion mixers, especially those with mixing blades of the "sigma" type are particularly preferred.

Agitation of the pigment bearing medium containing the corn syrup, corn syrup solids or molasses is conducted until the pigment has been given an appropriate particle size distribution, i.e., one giving the pigment commercial acceptability as a colorant. Usually this is done over 1-20 hours, preferably 2-8 hours, at a temperature between about 20° and 100° C., preferably about 50°-90° C. If the pigment has any significant water content, e.g., a wet presscake, or is very hygroscopic the agitation should preferably be done at a sufficiently elevated temperature to evaporate this water fairly quickly. The presence of too much water tends to adversely effect the viscosity of the mass undergoing treatment and thus decreases the efficiency of the process.

The conditioned pigment is recovered by usual methods. For example, the pigment mass is removed from the apparatus, and the pigment is extracted by dissolving the conditioning agent and optionally the viscosity modifying agent in water and the pigment is filtered off and dried.

The pigments conditioned according to the present invention possess very good pigmentary properties and overall excellent dispersibility. They are especially suitable for incorporation into automotive paints or for plastic coloration.

The uniqueness of the process according to the present invention is that essentially no salt is used to condition the pigment. This enables the batch size to be increased and also eliminates the dusting and corrosion that comes from the salt.

The invention is further illustrated but is not intended to be limited by the following examples in which all parts and percentages are by weight unless otherwise specified.

EXAMPLES

Example 1

Into a heavy duty double-armed laboratory mixer with a 1 liter capacity are charged 64 grams crude C.I. Pigment Red 179, 39 grams corn syrup and 19 g polyethylene glycol 400. The mixture is heated via steam in the mixer jacket to 60° C. and is agitated for 3 hours at 50°–95° C. Polyethylene glycol 400 is added as needed to keep a good stirrable mass.

When the size reduction is complete the mixture is removed from the machine and the corn syrup and the polyethylene glycol 400 are removed by dissolving them in water. The pigment is filtered off.

Example 2

Into a heavy duty double-armed laboratory mixer with a 1 liter capacity are charged 213 grams aqueous presscake of crude C.I. Pigment Red 179 (containing 64 grams of pigment calculated on a dry weight basis), 40 grams corn syrup and 10 grams polyethylene glycol 400. The mixture is heated via steam in the mixer jacket to 80° C. and the water from the presscake is allowed to be driven off until the mass is grindable. The mixture is agitated for 3 hours at 45°–95° C. Polyethylene glycol 400 is added as needed to keep a good stirrable mass.

When the size reduction is complete the material is removed from the mixer and treated as in Example 1 to recover the pigment.

The recovered pigment, when dispersed in appropriate standard vehicles, gave both mass and tint tones at least as good as those obtained from salt ground pigment.

Example 3

Into a heavy duty double-armed laboratory mixer with a 1 liter capacity are charged 64 grams crude copper phthalocyanine blue C.I. Pigment Blue 15, 46 grams corn syrup and 20 grams polyethylene glycol 400. The mixture is heated via steam in the mixer jacket to 60° C. and is agitated for 6 hours at 55°–65° C. Polyethylene glycol 400 is added as needed to keep a good stirrable mass.

When the size reduction is complete the mixture is removed from the mixer and treated as in Example 1 to recover the pigment.

The recovered pigment, when dispersed in appropriate standard vehicles, gave both mass and tint tones at least as good as those obtained from salt ground pigment.

Example 4

Into a heavy duty double-armed laboratory mixer with a 1 liter capacity are charged 96 grams crude copper phthalocyanine blue containing 3–4% of chlorine and 64 grams corn syrup. The mixture is heated via steam in the mixer jacket to 50°–55° C. and is agitated for 2 hours at 50°–75° C. Polyethylene glycol 400 (44 grams) is added as needed to get a suitable mass consistency.

When the size reduction is complete the material is removed from the mixer and treated as in Example 1 to recover the pigment.

The recovered pigment, when dispersed in appropriate standard vehicles, gave both mass and tint tones at least as good as those obtained from salt ground pigments.

Example 5

Into a heavy duty double-armed laboratory mixer with a 1 liter capacity are charged 96 grams crude copper phthalocyanine blue containing 3–4% of chlorine and 64 grams corn syrup. The mixture is heated via steam in the mixer jacket to 50°–55° C. and is agitated for 4 hours at 50°–75° C. Polyethylene glycol 400 (44 grams) is added as needed to get a suitable mass consistency.

When the size reduction is complete the material is removed from the mixer and treated as in Example 1 to recover the pigment.

The recovered pigment, when dispersed in an appropriate vehicle, gave a mass tone which was deeper, more transparent and had a stronger undertone than that obtained from the conditioned pigment of Example 4.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for conditioning a crude pigment by subjecting it to shear the improvement which comprises conditioning it in the presence of an agent selected from the group consisting of corn syrup, corn syrup solids and molasses in a high shear mixing device in the absence of any solid grinding aid.

2. The process of claim 1 wherein the viscosity of the medium is adjusted with a protic polar solvent during the course of applying the shear.

3. The process according to claim 1 wherein the conditioning agent is corn syrup.

4. The process according to claim 1 wherein the conditioning agent is employed in an amount of 0.2 to 5 parts by weight, based on 1 part by weight of the crude pigment.

5. The process according to claim 1 wherein the conditioning agent is employed in an amount of 0.5 to 2 parts by weight, based on 1 part of the crude pigment.

6. The process according to claim 2 wherein the protic polar solvent is selected from the group consisting of water, glycols, polyglycols and glymes and mixtures thereof.

7. The process according to claim 1 wherein the viscosity modifying agent employed is polyethylene glycol 400.

8. The process according to claim 2 wherein the viscosity modifying agent is employed in an amount of up to 50 parts by weight, based on 1 part by weight of the crude pigment.

9. The process according to claim 1 wherein the pigment employed is C.I. Pigment Red 179.

10. The process according to claim 1 wherein the pigment employed is C.I. Pigment Blue 15.

11. The process according to claim 1 wherein the pigment employed is copper phthalocyanine blue containing 3-4% of chlorine.

12. The process of claim 1 wherein the shear is applied in a double arm mixer.

13. The process of claim 1 wherein the shear is applied in a continuous mixer.

14. A process for conditioning a crude organic pigment which comprises:
   (a) subjecting it to shear in a medium free from any solid grinding aid;
   (b) in the presence of between about 0.5 and 2 parts by weight of a conditioning agent selected from the group consisting of corn syrup, corn syrup solids, molasses and mixtures thereof based on 1 part by weight of dry crude pigment;
   (c) using up to 50 parts by weight based on 1 part by weight of crude pigment of a protic polar solvent selected from the group consisting of glycols, polyglycols, glymes and mixtures thereof to adjust the viscosity of the mass under shear, and
   (d) applying the shear in a continuous mixer or batch mixer other than a masticator.

* * * * *